(No Model.)
O. SELG.
COVER FASTENING FOR FRUIT JARS.
No. 599,458. Patented Feb. 22, 1898.
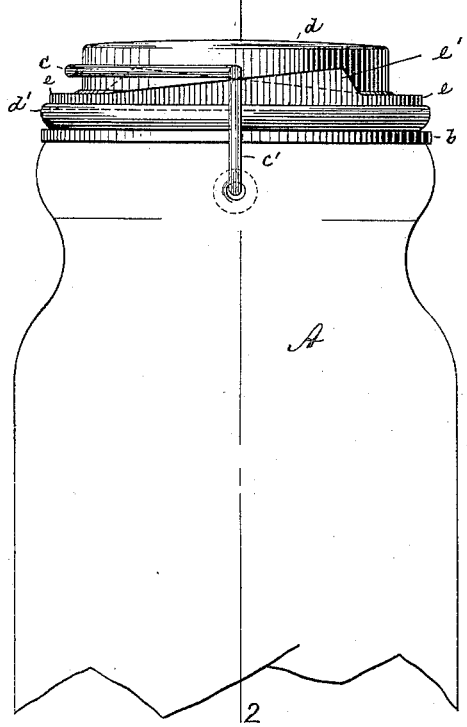
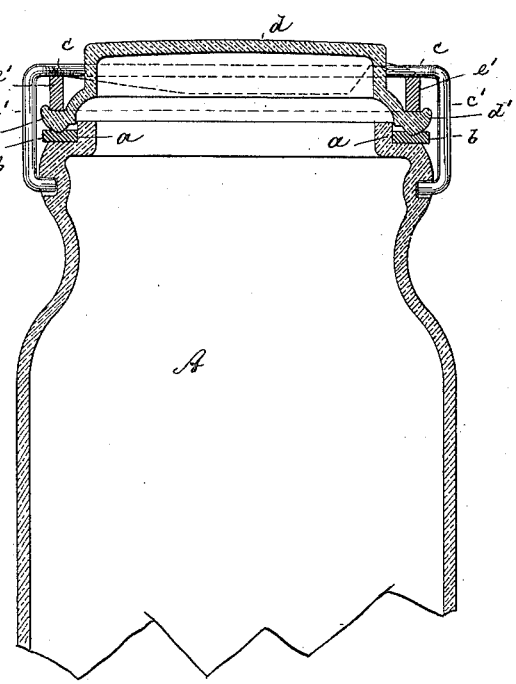
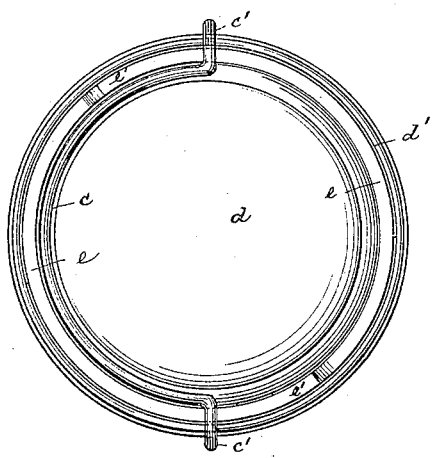
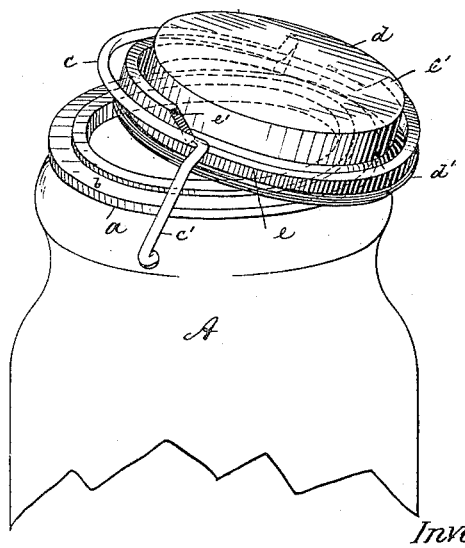
Witnesses:
John Becker.
William Miller.
Inventor:
Otto Selg
by his attorneys
Roeder & Briesen

UNITED STATES PATENT OFFICE.

OTTO SELG, OF BROOKLYN, NEW YORK.

COVER-FASTENING FOR FRUIT-JARS.

SPECIFICATION forming part of Letters Patent No. 599,458, dated February 22, 1898.

Application filed November 12, 1897. Serial No. 658,265. (No model.)

*To all whom it may concern:*

Be it known that I, OTTO SELG, a citizen of the United States, and a resident of Brooklyn, in the county of Kings and State of New York, have invented certain new and useful Improvements in Cover-Fastenings for Jars, of which the following is a specification.

This invention relates to a cover-fastening for jars which is so constructed that the cover may be readily removed from and reapplied to the jar. With jar-fastenings it is desirable that the cover be bodily removable from the jar when the latter is opened, and thus ready means should be provided that permit the prompt removal and replacement of the cover and which securely lock the cover to the jar when closed. My improved fastening accomplishes these results in a simple and effective manner.

In the accompanying drawings, Figure 1 is a side elevation of a jar provided with my improved cover-fastening; Fig. 2, a longitudinal section on line 2 2, Fig. 1; Fig. 3, a plan of the cover-fastening, and Fig. 4 a perspective view thereof.

The letter A represents the body of a jar provided with a flanged neck $a$ for the support of an annular washer $b$. To the jar A there is pivoted a semicircular or open bail $c$, which is bent at its ends first diametrically outward and then downward, as at $c'$, to form bent arms, the lower ends of which are pivotally connected to the jar in suitable manner. The semicircular portion of bail $c$ is adapted to partly embrace the upwardly-bulged central portion $d$ of the cover in such a manner that the cover may be readily introduced or withdrawn through the open half of the bail. A flange $d'$ of the cover has a lower tapering edge, which is adapted to form a tight joint with washer $b$, while it supports on its upper side a revoluble cam-ring $e$, provided with two diametrically-placed upwardly-extending wedges $e'$. Between the cam-ring $e$ and the dome $d$ of the cover there is formed a circular channel, which receives the semicircular section of the bail $c$, such section being of smaller diameter than the cam-ring. Thus while the semicircular section of the bail is confined between the dome $d$ and the cam-ring its radial arms $c'$ extend transversely across the ring to become engaged and actuated thereby.

To close the jar, the cover, with the cam-ring seated thereon, is slipped under the bail, which is tilted, Fig. 4, to clear the wedge, and after the cover is seated upon the washer $b$ the cam-ring is revolved until its wedges bear firmly against the bail and thus securely lock the cover to its seat.

To open the jar, the cam-ring is revolved to become disengaged from the bail, and then the cover, together with the cam-ring, may be readily removed by being slipped out of the open half of the bail. In this way it will be seen that the cover is easily removable and attachable and that when seated it may be firmly locked to the jar.

What I claim is—

A cover-fastening for jars composed of a flanged removable cover having a dome, a cam-ring seated upon the cover-flange at a distance from the dome to form an intervening circular channel, and a semicircular bail of smaller diameter than the cam-ring and adapted to be received by said channel, the bail having laterally and downwardly extending arms that project across the cam-ring and are pivotally connected to the jar, substantially as specified.

Signed at New York, in the county of New York and State of New York, this 8th day of November, A. D. 1897.

OTTO SELG.

Witnesses:
  F. V. BRIESEN,
  WILLIAM MILLER.